United States Patent Office 2,834,648
Patented May 13, 1958

2,834,648

DISPROPORTIONATION OF CHLOROSILANES EMPLOYING AMINE-TYPE CATALYSTS

Donald L. Bailey, Snyder, Paul W. Shafer, Niagara Falls, and George H. Wagner, Clarence, N. Y., assignors to Union Carbide Corporation, a corporation of New York No Drawing. Application March 25, 1953
Serial No. 344,683

17 Claims. (Cl. 23—14)

This invention relates to those compounds normally termed chlorosilanes and, more particularly, to the production of such compounds by a new and improved process.

The widely known methods for the production of chlorosilanes yield, in general, a trichlorosilane as the principal product. In such methods, however, there is also obtained minor proportions of other compounds including monochloro- and dichlorosilanes. The latter compounds have been found particularly useful in numerous syntheses, and therefore considerable attention has been directed toward their production. Heretofore, efforts to obtain such compounds have been for the most part directed toward either modifying the well-known reactions which yield a trichlorosilane or by reacting a trichlorosilane with other compounds whereby one or more chlorine atoms are removed. Production of monochloro- and dichlorosilanes by either of the above methods has not proven entirely satisfactory and, consequently, the need for an improved method exists.

In its broadest aspects, the invention permits, in an assemblage of chlorosilane molecules, a redistribution of particular atoms connected to silicon. Such redistribution may be termed a disproportionation of the molecule whereby a rearrangement of the atoms is accomplished. It has been found that the method of our invention effects disproportionation of only those chlorosilane molecules containing at least one hydrogen to silicon bond. In each instance where disproportionation occurs, the redistribution affects only those hydrogen and chlorine atoms which are bonded to a silicon atom. For example, trichlorosilane, $HSiCl_3$, may be disproportionated whereby a rearrangement of hydrogen and chlorine atoms occurs to yield dichlorosilane, $H_2SiCl_2$, and silicon tetrachloride, $SiCl_4$. Dichlorosilane, $H_2SiCl_2$, may also be disproportionated and yields monochlorosilane, $H_3SiCl$, and trichlorosilane, $HSiCl_3$. In a like manner, under the teachings of our invention, the chlorosilanes substituted with a hydrocarbon radical may be disproportionated so long as such molecules contain at least one hydrogen atom bonded to a silicon atom. For example, an alkyldichlorosilane disproportionates to the alkyltrichlorosilane and the alkylmonochlorosilane. The redistribution of atoms which occurs when disproportionating a substituted chlorosilane is limited solely to a rearrangement of those hydrogen and chlorine atoms bonded to silicon. The substituent group or groups bonded to the silicon atom of a chlorosilane are not affected by the process of our invention.

Disproportionation is effected in accordance with the present invention by treating the chlorosilanes with an amine-type catalyst. The amount of catalyst employed is not critical and, therefore, from about 1% to about 15% by weight of the chlorosilane may be used. The preferred range however, varies from about 1% to about 5% by weight of the chlorosilane.

In the preferred embodiment of our invention, the chlorosilane is treated with the amino-type catalyst at temperatures ranging from 150° C. to 200° C. Temperatures greater than 200° C. may also be employed. However, at such higher temperatures, the catalyst may decompose and lose its catalytic effect. Lower temperature may, of course, also be employed.

The redistribution effected by the disproportionation of chlorosilanes conducted in accordance with the present invention may be represented by the following equation:

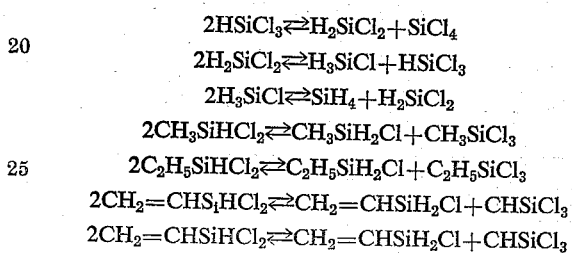

wherein R may be alkyl, aryl, chlorine or hydrogen.

Representative examples of the effected rearrangement are depicted by the following equations wherein trichlorosilane, dichlorosilane, methyldichlorosilane, ethyldichlorosilane, vinyldichlorosilane, and phenyldichlorosilane are disproportionated:

$$2HSiCl_3 \rightleftarrows H_2SiCl_2 + SiCl_4$$

$$2H_2SiCl_2 \rightleftarrows H_3SiCl + HSiCl_3$$

$$2H_3SiCl \rightleftarrows SiH_4 + H_2SiCl_2$$

$$2CH_3SiHCl_2 \rightleftarrows CH_3SiH_2Cl + CH_3SiCl_3$$

$$2C_2H_5SiHCl_2 \rightleftarrows C_2H_5SiH_2Cl + C_2H_5SiCl_3$$

$$2CH_2=CHSiHCl_2 \rightleftarrows CH_2=CHSiH_2Cl + CHSiCl_3$$

$$2CH_2=CHSiHCl_2 \rightleftarrows CH_2=CHSiH_2Cl + CHSiCl_3$$

Thus, the general effect of the disproportionation of a given chlorosilane is to form two different chlorosilanes, one of which contains more chlorine atoms and fewer hydrogen atoms bonded to silicon than the starting material and the other of which contains fewer chlorine atoms and more hydrogen atoms bonded to silicon than the starting chlorosilane.

The process of our invention may be conducted by any suitable method. However, as we prefer to employ temperatures from 150° C. to 200° C. and as the boiling points of many chlorosilanes are below 150° C., it is convenient to conduct the reaction either in an autoclave or by continuously passing vapors of the chlorosilane over a bed of the catalyst. Whenever chlorosilanes having boiling points above the preferred temperatures are disproportionated, it is possible to conduct the reaction at atmospheric pressure.

As is evident from the above equations, the disproportionation reactions are in thermodynamic equilibria, and therefore the products of such reactions are present in the reaction mixture in amounts determined by the equilibrium constants for the reactions. In those instances where disproportionations can be conducted at atmospheric pressure, yields greater than the equilibrium amounts may be obtained by conducting the reaction at the reflux temperature of the reaction mixture. By so doing, the lower boiling chlorosilane formed in the disproportionation will distill thus causing the reaction to proceed toward completion with increased yields.

The catalyst as hereinbefore indicated is an amine-type compound and is generally employed in amounts ranging from about 1% to about 15% by weight of the chlorosilane. Amounts of the catalyst in excess of 15% have been found not to materially increase the yield of the reaction. Examples of our catalysts include the secondary and tertiary aliphatic amines, their salts and derivatives, and heterocyclic amines. Particularly useful catalysts are the di- and trialkylamines, the di- and trialkylamine salts and complexes such as trimethylamine-trichlorosilane complex and trimethylamine-hydrochloride; pyridine and hexmethylene-tetramine.

When employing the process of our invention to disproportionate a chlorosilane having a boiling point below 150° C., we normally prefer to conduct the reaction in a pressure vessel, for example, a rocking autoclave. In such instances, the procedure followed comprised charging a chlorosilane and an appropriate catalyst to the vessel sealing and applying heat thereto. Air was excluded from the vessel prior to sealing by purging with dry nitrogen or hydrogen gas. Heating was continued for a period at a constant temperature within the range of from 150° C. to 200° C., after which time the vessel was cooled to room temperature, opened, and the contents removed for analysis. Generally, identification was accomplished by distillation and infrared analysis.

The table below gives the results of disproportionations conducted in accordance with the present invention. In each instance, trichlorosilane, the compound disproportionated, was charged to an electrically heated autoclave with a catalyst and heated at a temperature of between 150° and 200° C. Specifically noted in the table are the amounts of trichlorosilane and catalyst initially charged, temperature, and period of heating, and the product, together with the amount thereof.

TABLE I

*Disproportionation of chlorosilanes*

| Trichloro-silane (moles) | Catalyst | | Temp. (°C.) | Time (hr.) | Mole-percent $H_2SiCl_2$ in reaction product |
|---|---|---|---|---|---|
| | Moles | Compound | | | |
| 2 | 0.013 | Trimethylamine | 150 | 2 | 6.1 |
| 2 | 0.013 | ---do--- | 200 | 2 | 10.8 |
| 2 | 0.024 | Trimethylamine trichlorosilane salt. | 150 | 2.25 | 7.6 |
| 2 | 0.014 | ---do--- | 200 | 2 | 10.9 |
| 2 | 0.025 | Trimethylamine hydrochloride. | 200 | 0.25 | 9.0 |
| 2 | 0.015 | Diethylamine | 200 | 2 | 4.1 |
| 2 | 0.022 | Triethylamine | 200 | 2 | 7.4 |
| 2 | 0.011 | ---do--- | 250 | 2 | 6.8 |
| 2 | 0.036 | Cetyldimethyl-amine. | 175 | 0.25 | 11.0 |
| 2 | 0.036 | Hexamethylene-tetramine. | 180 | 0.5 | 9.8 |
| 2 | 0.012 | ---do--- | 200 | 1 | 9.6 |
| 2 | 0.036 | N,N'Tetraethyl-ethylenediamine. | 180 | 0.25 | 8.4 |
| 2 | 0.025 | Pyridine | 200 | 2 | 3.7 |

To illustrate that temperatures below 150° C. may be employed to effect disproportionation, we placed fifty (50) grams of trichlorosilane and two and one-half (2.5) grams of hexaethyltriaminotriazine in a one hundred (100) cc. flask. The flask was tightly stoppered and allowed to stand for twenty-four hours at room temperature, at which time the reaction mixture was removed and analyzed for dichloro- and trichlorosilane content by infrared absorption. The mixture was found to contain five and eight-tenths (5.8) mole-percent of dichlorosilane and ninety-one (91) mole-percent of trichlorosilane.

Although the disproportionation of representative chlorosilanes has been disclosed, it is to be understood that such disproportionation may take place with all chlorosilanes including the hydrocarbon substituted chlorosilanes, so long as the silicon atom therein has at least one hydrogen atoms bonded thereto. Furthermore, while representative catalysts have been disclosed, it should be understood that the invention is directed toward the use of all amine-type compounds as disproportionating catalysts.

We claim:

1. A process of disproportionating a chlorosilane containing at least one hydrogen atom bonded to silicon, which comprises heating said silane with a hydrocarbyl amine catalyst at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

2. A process of disproportionating a chlorosilane substituted with a hydrocarbyl radical and containing at least one hydrogen atom bonded to silicon, which comprises heating said silane with a hydrocarbyl amine catalyst at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

3. A process of disproportionating an alkyl chlorosilane containing at least one hydrogen atom bonded to silicon, which comprises heating said silane with a hydrocarbyl amine catalyst at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

4. Process of disproportionating a chlorosilane containing at least one hydrogen atom bonded to silicon which comprises heating said silane with a secondary aliphatic hydrocarbyl amine at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

5. Process of disproportionating a chlorosilane containing at least one hydrogen atom bonded to silicon which comprises heating said silane with a tertiary aliphatic hydrocarbyl amine at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

6. Process of disproportionating a chlorosilane containing at least one hydrogen atom bonded to silicon which comprises heating said silane with a heterocylic amine, said amine containing only hydrogen, carbon and nitrogen atoms, at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

7. Process of disproportionating a chlorosilane containing at least one hydrogen atom bonded to silicon which comprises heating said silane with trimethylamine-trichlorosilane complex at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

8. Process of disproportionating a chlorosilane containing at least one hydrogen atom bonded to silicon which comprises heating said silane with trimethylamine-hydrochloride at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

9. Process of disproportionating a chlorosilane containing at least one hydrogen atom bonded to silicon which comprises heating said silane with trimethylamine at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

10. Process of disproportionating a chlorosilane containing at least one hydrogen atom bonded to silicon which comprises heating said silane with cetyldimethyl amine at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

11. Process of disproportionating a chlorosilane containing at least one hydrogen atom bonded to silicon which comprises heating said silane with N,N'-tetraethylethylenediamine at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

12. A process of diproportionating a chlorosilane containing only hydrogen and chlorine atoms attached to silicon which comprises heating said silane with a hydrocarbyl amine catalyst at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

13. A process of disproportionating a chlorosilane containing only hydrogen and chlorine atoms attached to silicon which comprises heating said silane with a secondary aliphatic hydrocarbyl amine at a temperature of at least 150 C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

14. A process of disproportionating a chlorosilane containing only hydrogen and chlorine atoms attached to silicon which comprises heating said silane with a tertiary aliphatic hydrocarbyl amine at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

15. A process of disproportionating a chlorosilane containing only hydrogen and chlorine atoms attached to silicon which comprises heating said silane with trimethylamine at a temperature of at least 150° C. and recovering two different silane compounds one of which contains more chlorine atoms and fewer hydrogen atoms attached to silicon than the starting chlorosilane and the other contains more hydrogen atoms and fewer chlorine atoms attached to silicon than the starting chlorosilane.

16. The process of disproportionating trichlorosilane to form dichlorosilane which comprises heating trichlorosilane in the presence of a tertiary aliphatic amine.

17. A process of disproportionating trichlorosilane to form dichlorosilane which comprises heating trichlorosilane in the presence of a trialkylamine.

References Cited in the file of this patent

FOREIGN PATENTS 663,810    Great Britain _____ Dec. 27, 1951

OTHER REFERENCES

Sauer et al.: Jour. Am. Chem. Soc., vol. 70 (1948), pages 3590–3596.

UNITED STATES PATENT OFFICE
Certificate of Correction

Patent No. 2,834,648                                               May 13, 1958

Donald L. Bailey et al.

It is hereby certified that error appears in the printed specification of the above numbered patent requiring correction and that the said Letters Patent should read as corrected below.

Column 1, line 72, for "amino-type" read —amine-type—; column 2, line 26, the equation should appear as shown below instead of as in the patent— same column 2, line 28, the equation should appear as shown below instead of as in the patent—

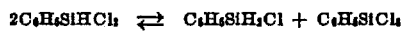

column 3, line 60, for "atoms" read —atom—.

Signed and sealed this 12th day of August 1958.

[SEAL]

Attest:
KARL H. AXLINE,
*Attesting Officer.*

ROBERT C. WATSON,
*Commissioner of Patents.*